Aug. 6, 1929.      S. M. FAIRCHILD      1,723,926
INFORMATION RECORDING ATTACHMENT FOR CAMERAS
Filed July 19, 1927      2 Sheets-Sheet 1
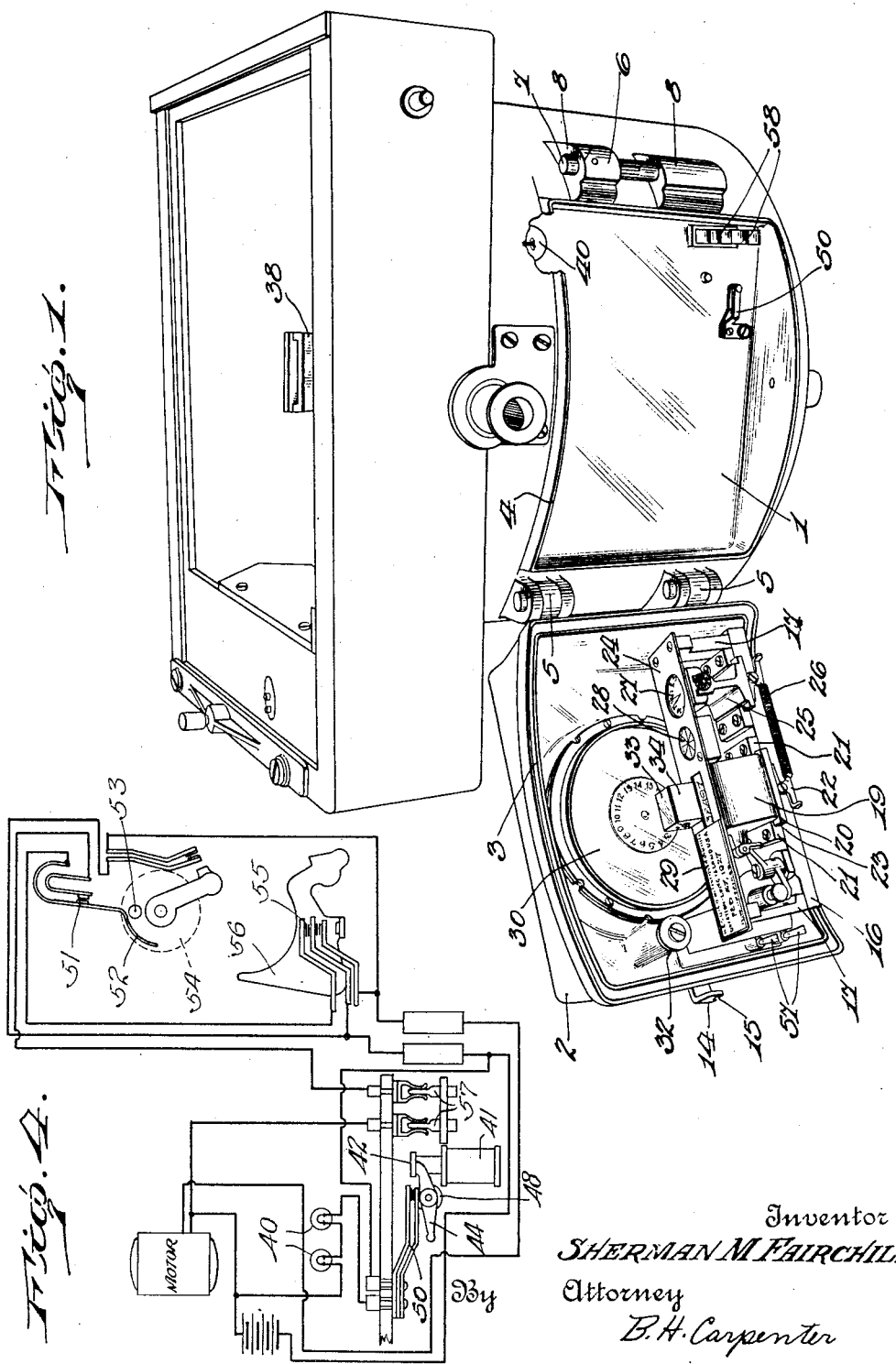
Inventor
SHERMAN M FAIRCHILD
Attorney
B. H. Carpenter

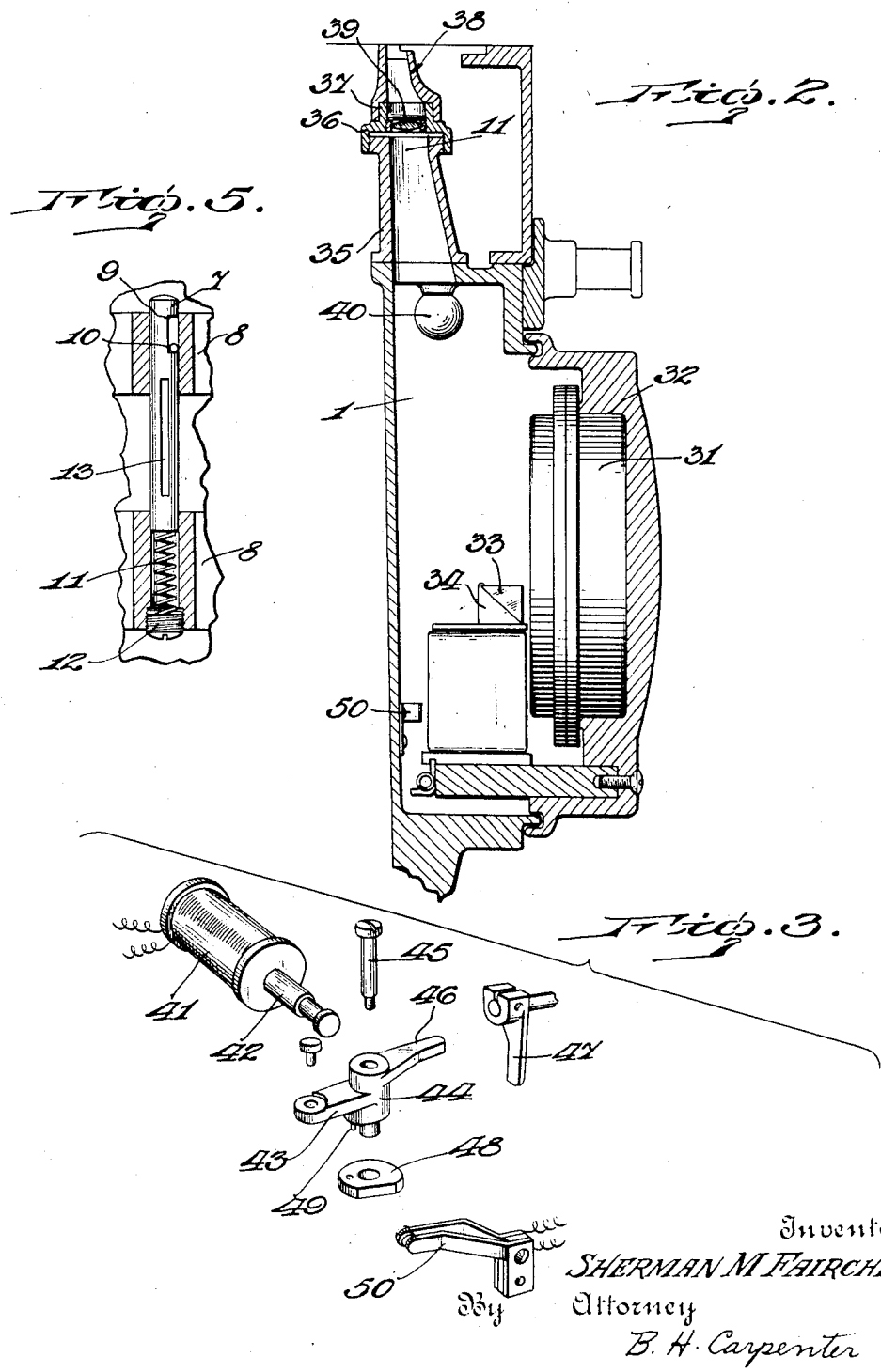

Patented Aug. 6, 1929.

1,723,926

UNITED STATES PATENT OFFICE.

SHERMAN MILLS FAIRCHILD, OF NEW YORK, N. Y.

INFORMATION-RECORDING ATTACHMENT FOR CAMERAS.

Application filed July 19, 1927. Serial No. 206,856.

This invention relates to devices for recording information upon photographic films at the time of exposure thereof and particularly to devices for recording such information thru a separate lens.

One of the objects of this invention is to provide means for recording photographically on a film in reduced size the readings of a group of instruments at the instant of exposure of the film.

Another object of this invention is to provide a new and novel manner of photographing said instruments by controlling the duration of illumination thereof.

Another object of this invention is to provide means for recording information photographically on a portion of a photographic film at the time of exposure of the film without the use of a shutter.
Another object of this invention is to provide a mounting for said instruments which is readily detached from the camera and from which the instruments are readily detached and replaced.
Another object of this invention is to provide means for photographing the reading of a group of instruments at least one of which readings is substantially parallel with the axis of the photographing lens and one substantially at right angles thereto.

Other objects and advantages will become apparent from the following specification, claims and appended drawings in which:—

Fig. 1 is a perspective view of my device applied to an aerial camera, showing the instrument box door open.

Fig. 2 is a vertical sectional view taken thru the axis of the recording lens.

Fig. 3 is a distended view of the counter operating and exposure controlling mechanism.

Fig. 4 is a diagrammatic view of the exposure circuit and the control means therefor.

Fig. 5 is a detail of the instrument box door latching device.

The embodiment of my device shown in the drawings comprises an auxiliary camera combined with and built into an aerial camera of the type shown in my United States Patent 1,612,860 issued January 4, 1927, both cameras focusing on the same sensitized surface. The auxiliary camera is for the purpose of photographing on a restricted area of said sensitized surface, the reading of an indicating instrument or instruments at the same time as the exposure of the remainder of the surface by the main camera lens.

In the drawings, I have shown only as much of the mechanism and construction of the aerial camera of my United States Patent 1,612,860, issued January 4, 1927, as is necessary for the understanding of my present invention.

In Fig. 1, I have shown my device applied to the cone of the aerial camera shown in my United States Patent 1,612,860 issued January 4, 1927. As will be readily seen in this figure, I have provided a recess 1 in said cone and a closure or door 2 forming a closed light tight chamber. The light proofing of the junction between the door and the recess is accomplished by a groove 3 extending around the door and interfitting with a downwardly projecting tongue 4 surrounding the aperture. The door is mounted from the camera cone by readily detachable pin hinges 5 and a spring latch 6.

The pin hinges are of usual and ordinary construction and require no further description than that the hinge pins are held in place by cotter pins and are thus very readily removable. The latch 6 is of spring type and, as shown in Figs. 1 and 5 is composed of a sliding plunger member 7 mounted for vertical sliding movement in spaced bearings 8, adjacent the recess 1. The extent of sliding movement of the plunger member 7 is governed by a recess 9 in the pin 7 which cooperates with a pin 10 in the upper bearing 8. The plunger member 7 is normally biased to the upper position permitted by the recess 9 and pin 10 by a spring 11 positioned with a lower bearing 8 and abutting at its upper end against the lower end of plunger 7 and at its lower end against a screw plug 12 threaded in the lower side of the lower bearing 8. Between the bearings 8, the plunger member 7 is provided with a slot 13 through which a latch member 14 is secured to the door 2 and is adapted to extend when the door is in closed position. The latch member 14 is provided with a notch 15 which engages with the lower end of the slot 13 when the door is in closed position thus securely locking the door. To release the door it is only necessary to depress the plunger 7 thus carrying the lower end of the slot 13 out of engagement with the notch 15.

In order to provide for the ready replacing of indicating instruments either separately or as an entire unit I have mounted the same upon the door 2. In the drawings I have shown the following instruments; a watch, level, consecutive number counter, barometer, and a tablet upon which may be written any desired data. Other instruments may, of course, be substituted or added. This group of instruments is, of a relatively large over-all dimension. However, I have condensed the positioning of the group materially by mounting the barometer substantially in an upright position with respect to the remaining instruments. The indicating instruments exclusve of the barometer are mounted in a frame secured to the door 2 by screws or in any other suitable manner.

As shown in Fig. 1, the indicating instruments exclusive of the barometer are mounted in a frame supported from the door 2. This frame comprises a base 16, upright end portions 17, and a top strip 18. The indicating instruments are mounted between the base 16 and the top strip 18 and the indications thereof are readable through apertures in said top strip.

The consecutive number counter is provided with a flange base 20 which engages retaining rails 21 on the base 16, as shown in Fig. 1, and is locked in position by a latch 22 engaging a groove 23 in the bottom of the base 20. The watch member, I have designated by the numeral 24 and the same is detachably secured to a supporting base 25 which is in turn detachably secured to the base 16 in the same manner as the consecutive number counter 19 and therefore needs no further description. The watch member is removably secured to its supporting base 25 in any suitable manner as by spring prongs, and is readily removed vertical therefrom when the supporting base 25 is disengaged from the base 16. However, when the base 25 is in position in the instrument assembly, the watch 27 is prevented by the top plate 18 from moving upwardly and is thus held firmly to its supporting base 25. A spring 26 connects the latch member 22 retaining the consecutive number counter to the latch retaining the base upon which the watch 27 is mounted and biases each of said latch members to engaging position.

The level is secured to the top plate 18 by screws or in any other suitable manner. While I have shown a spherical level 28 I do not desire to limit myself to this construction as any other suitable type may be used with equal facility. A recording tablet 29 is also secured to the top strip 18 in any suitable manner and as shown in the drawings comprises a removable card secured in place by side clips and end stops. I realize that there are a great many ways in which a card or tablet may be secured to the top strip 18 and do not desire to limit myself to the specific attachment shown.

The barometric device I have indicated in the drawings by the numeral 30. This instrument, as hereinbefore stated, is mounted in an upright position. I have also mounted the barometer 30 as to permit adjustment thereof so as to bring any desired setting to the reading point. The barometer shown is of an aneroid type having a cylindrical base 31 which fits within a similar shaped aperture 32 in the door and is rotatable therein for adjusting the setting thereof. For securing the barometer in adjusted position, I have provided a clamping nut 32, as shown in Fig. 1.

It is evident that the indicating dial of the barometer will be in a plane substantially at right angles to the remainder of the instrument dials and in order to photograph the reading thereof at the same time as the remainder of the instruments, I have provided a prism 33 mounted by a base 34 from the top strip 18 of the instrument assembly. This prism covers but a relatively small portion of the indicating dial of the barometer and thus only a small portion of the dial will be reproduced in the photograph of the instrument group.

From the top of the receptacle 1, a lens funnel 1' is secured and extends to a point adjacent the sensitized surface or film in the aerial camera. This lens funnel is composed of a lower portion 35 secured to the top of the receptacle. The upper end of this funnel member 35 is provided with threads which cooperate with a downwardly extending threaded portion of a lens supporting member 36 proving an adjustment at this point. This member 36 is provided with an upwardly extending cylindrical portion 37 which engages a similarly shaped portion on the upper funnel portion 38. A lens 39 is adjustably mounted within the member 37. In the drawings I have shown a single lens but it is obvious that any desired type of lens may be used without departing from the spirit of my invention. The upper end of the member 38 is notched as shown in Figs. 1 and 2 to receive the strip of the film magazine which is not shown in the drawings and thus permitting the member 38 to extend in close proximity to the glass positioning plate normally employed in this type of camera. It is thus seen that when the group of instruments within the receptacle are illuminated, the lens 39 will throw an image thereof reduced to any desired size upon the sensitized surface employed in the camera.

The upper end of the funnel portion 38 is rectangular in shape and masks off all of the field of the lens 39 except that covering the instrument readings. The upper end of the funnel portion 38 lies adjacent the side of the magazine opening and the readings of the instruments are therefore photographed at the side of the sensitized surface in the camera. In actual practice the area occupied by the photograph of the instrument readings is a rectangular area about one inch by one-fourth inch and meets the main image in a hair line.

To illuminate the instruments I prefer to use electric incandescent bulbs one of which is shown in Figs. 1 and 2 and indicated by the numeral 40. In practice I employ two of these bulbs one on either side of the lens funnel 1' and fitting in sockets in the top of the recess 1. To increase the illumination within the receptacle 1, the inner walls thereof are painted or enamelled white. In photographing the image of the instruments upon the sensitized surface of the camera, I have dispensed with the use of a shutter and govern the exposure by controlling the duration of illumination of the bulbs 40. The manner in which the duration of illumination is controlled will be more fully hereinafter described.

It is, of course, desirous to record the reading of the group of instruments at the instant of exposure of the camera film and to this end I have provided an electrical controlling device consisting of a solenoid 41 which is operated substantially at the instant of exposure by the closure of its energizing circuit. The means for closing the circuit is shown diagrammatically in Fig. 4 of the drawings and comprises a switch mechanism 55 operated substantially simultaneously with the operation of the shutter mechanism of the aerial camera. This solenoid 41 when energized draws in its armature 42 which is connected to an arm 43 of a member 44 pivotally mounted from the base 16 by a screw stud 45. This member 44 is also provided with an arm 46 which when the member 44 is rocked by the drawing in of the solenoid 42 engages the operating arm 47 of the consecutive number counter 19 which is biased against said arm by a spring within the counter and advancing said number counter one unit.

A contact operating washer 48 of insulating material is secured to the member 44 in any suitable manner as by pin 49. This washer 48, as shown in Fig. 2, is provided with a flat face which normally lies adjacent a spring switch mechanism 50 fixed to the inner wall of the receptacle 1, as shown in Fig. 1. As the armature 42 rocks the member 44 the washer 48 will, of course, be rotated and the positioning of the flat face thereof is such that, after the operation of the consecutive number counter by the arm 46, the washer 48 will close the points of the switch mechanism 50. This switch mechanism 50 is shown in Figs. 1 and 4 and controls the circuit of the bulbs 40. It is thus obvious that the closing of this switch point will cause the illumination of the bulbs 40 and thus the illumination of the group of instruments. It is also obvious that upon illumination of the instruments, the image thereof will be thrown upon the sensitized surface employed in the camera by the lens 39 and thus recorded thereon.

The switch points 50 will remain closed and the bulbs 40 illuminated as long as the solenoid 41 is energized. Upon deenergization of the solenoid 41 the operation lever 47 of the consecutive number counter 19 will return the rock member 44 and armature 42 to normal position under the action of the spring within the said consecutive number counter 19. The spring switch points 50 are thus permitted to open and break the circuit thru the bulbs 40.

The energizing and deenergizing of the solenoid 41 is controlled by switch mechanism operated by the camera operating mechanism. The solenoid circuit contains two switches one of which is normally closed and the other normally open. The open switch, designated by the numeral 55 in the drawings, is adjacent the latch plate 56 of the aerial camera shutter and when the said shutter is tripped this switch is closed by said latch plate. The normally closed switch, designated in the drawings, as 51, is adjacent a disk 54 driven by the aerial camera operating mechanism. One of the points of this switch 51 is provided with an extension lying in the path of a pin 53 of insulating material mounted on the aforementioned disk 54.

The tripping of the latch plate 56 not only closes the switch 55 but also the motor operating circuit of the aerial camera. The areial camera operating mechanism immediately carries the pin 53 against the extension 52 thus opening the switch 51. The extension 52 is so formed as to cooperate with the pin 53 and hold the switch 51 open until the latch plate 56 has been returned sufficiently toward its normal position to permit the switch 55 to open. The opening of the switch 51 takes place while the sensitized film is still firmly held in exposure position.

The duration of the exposure of the readings of the instruments is of course the time interval between the closing of the switch 55 and the opening of the switch 51. This interval is independent of the shutter speed used in the aerial camera and produces at all times equal and correctly timed exposures of the instrument readings.

The solenoid 41 is mounted in the door 2 and I have provided a separable connection in the energizing circuit thereof. This connection consists of switch prongs 57 mounted on the door 2 and cooperating with spring forks 58 mounted in the receptacle 1. By this arrangement it is possible to remove the door 2 as a unit by simply removing the hinge pins and releasing the latch 6.

What I claim as my invention is:—

1. In an aerial camera, a plurality of indicating instruments mounted on said camera, means for throwing an image thereof in reduced size on a sensitized photographic surface within the camera, electrical means for illuminating said instruments, and a second electrical means for controlling the first electric means.

2. In an aerial camera, a plurality of indicating instruments mounted on said camera, means for throwing an image thereof in reduced size on a sensitized photographic surface within the camera, electrical means for illuminating said instruments, and a second electrical means for first operating one of said instruments and then controlling the first electric means.

3. In an aerial camera, a device for recording information on sensitized surface within said camera, including a chamber, a cover thereof, an instrument mounted on said cover and having an indicating dial, an indicating instrument mounted on the cover and having an indicating dial at an angle to the first indicating dial, and means for photographing the indicating readings of both of said indicating dials in true relative dimension upon said sensitive surface.

4. In an aerial camera, a device for recording information on a photographic surface within said camera including a receptacle detachably secured to said camera and having an indicating instrument mounted therein, means mounted on the camera for illuminating the indicating portion of said instrument, and a lens for throwing an image of the indication on to the photographic surface.

5. In an aerial camera having a recess formed therein, a device for recording information on a sensitized surface within said camera including a cover for said recess, an indicating instrument secured to said cover, means for illuminating said instrument mounted in said recess, and means mounted on said cover for controlling illumination of said illuminating means.

6. In an aerial camera, a device for recording information on a sensitized surface within said camera including a counter having a number indication, a lens for throwing an image of the number indication onto said sensitized surface, means for illuminating the number indication, and a common means for operating said counter and controlling said illuminating means.

7. In an aerial camera, a main lens for throwing an image on a sensitized surface within said camera, an auxiliary lens for throwing the image of a group of indicating instruments onto said sensitized surface within the field covered by said main lens, and a funnel member between the auxiliary lens and the sensitized surface for confining the image formed by the auxiliary lens on the sensitized surface to the indicating faces of said instruments.

8. In an aerial camera, a device for recording information on a sensitized surface within said camera including a receptacle detachably secured to said camera, a plurality of indicating instruments secured in said receptacle at least one of which is secured directly to the receptacle and at least one of which is secured indirectly to said receptacle, and a lens for throwing an image of the indications of all of said instruments onto the sensitized surface.

9. In an aerial camera having a main lens and shutter, a device for recording information on a sensitized surface within said camera including an indicating instrument, a lens for throwing an image of the indication of said instrument upon the sensitized surface, means for illuminating the indicating portion of said instrument to impress the image thereof on the sensitized surface, and means for controlling the duration of illumination independently of the duration of exposure by the main shutter whereby correct exposure of the indication portion of said indicating instrument is possible under varying external light conditions.

In testimony whereof I affix my signature.

SHERMAN MILLS FAIRCHILD.